(12) United States Patent  
Cloud

(10) Patent No.: US 6,215,939 B1  
(45) Date of Patent: Apr. 10, 2001

(54) OPTICAL FIBER SPLICE CASE WITH INTEGRAL CABLE CLAMP, BUFFER CABLE STORAGE AREA AND METERED AIR VALVE

(75) Inventor: Randy G. Cloud, Mentor, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 09/347,167

(22) Filed: Jul. 2, 1999

Related U.S. Application Data

(60) Provisional application No. 60/091,530, filed on Jul. 2, 1998.

(51) Int. Cl.[7] .................................................. G02B 6/00
(52) U.S. Cl. ......................... 385/135; 385/134; 385/136; 385/137
(58) Field of Search .................................... 385/100, 134, 385/135, 136, 137, 138

(56) References Cited

U.S. PATENT DOCUMENTS

| | | | | |
|---|---|---|---|---|
| 5,249,252 | * | 9/1993 | Noto | 385/135 |
| 5,278,933 | * | 1/1994 | Hunsinger et al. | 385/135 |
| 5,315,683 | * | 5/1994 | Miller | 385/136 |
| 5,446,823 | * | 8/1995 | Bingham et al. | 385/135 |
| 5,479,553 | * | 12/1995 | Deams et al. | 385/135 |
| 5,734,774 | * | 3/1998 | Morrell | 385/134 |
| 5,793,921 | * | 8/1998 | Wilkins et al. | 385/135 |
| 5,884,000 | * | 3/1999 | Cloud et al. | 385/135 |
| 5,896,486 | * | 4/1999 | Burek et al. | 385/135 |
| 6,044,193 | * | 3/2000 | Szentesi et al. | 385/134 |

* cited by examiner

Primary Examiner—Brian Healy  
(74) Attorney, Agent, or Firm—Fay, Sharpe, Fagan, Minnich & McKee, LLP

(57) ABSTRACT

A water proof and air tight fiber cable splice enclosure assembly includes a pair of housing members that are selectively releasably and sealingly clamped to each other to define a first storage volume and at least one keyhole slot connection area cooperative with an associated tie-down strap for connecting an optical fiber bundle to one of the first or second housing members. A set of arcuate wall members are formed on one of the housing members for defining an oval-shaped buffer cable storage space within the housing and an annular auxiliary cable storage space for storing an auxiliary length of the optical fiber bundle. An air valve is provided on one of the housing members for directing a flow of air into the storage space of the optical fiber splice case. The air valve is adapted to meter the flow of air into the space to below a predetermined threshold air flow rate. A pressure relief vent is provided on the enclosure to regulate air pressure accumulated within the storage volume to a pressure less than a predetermined maximum pressure threshold.

31 Claims, 7 Drawing Sheets

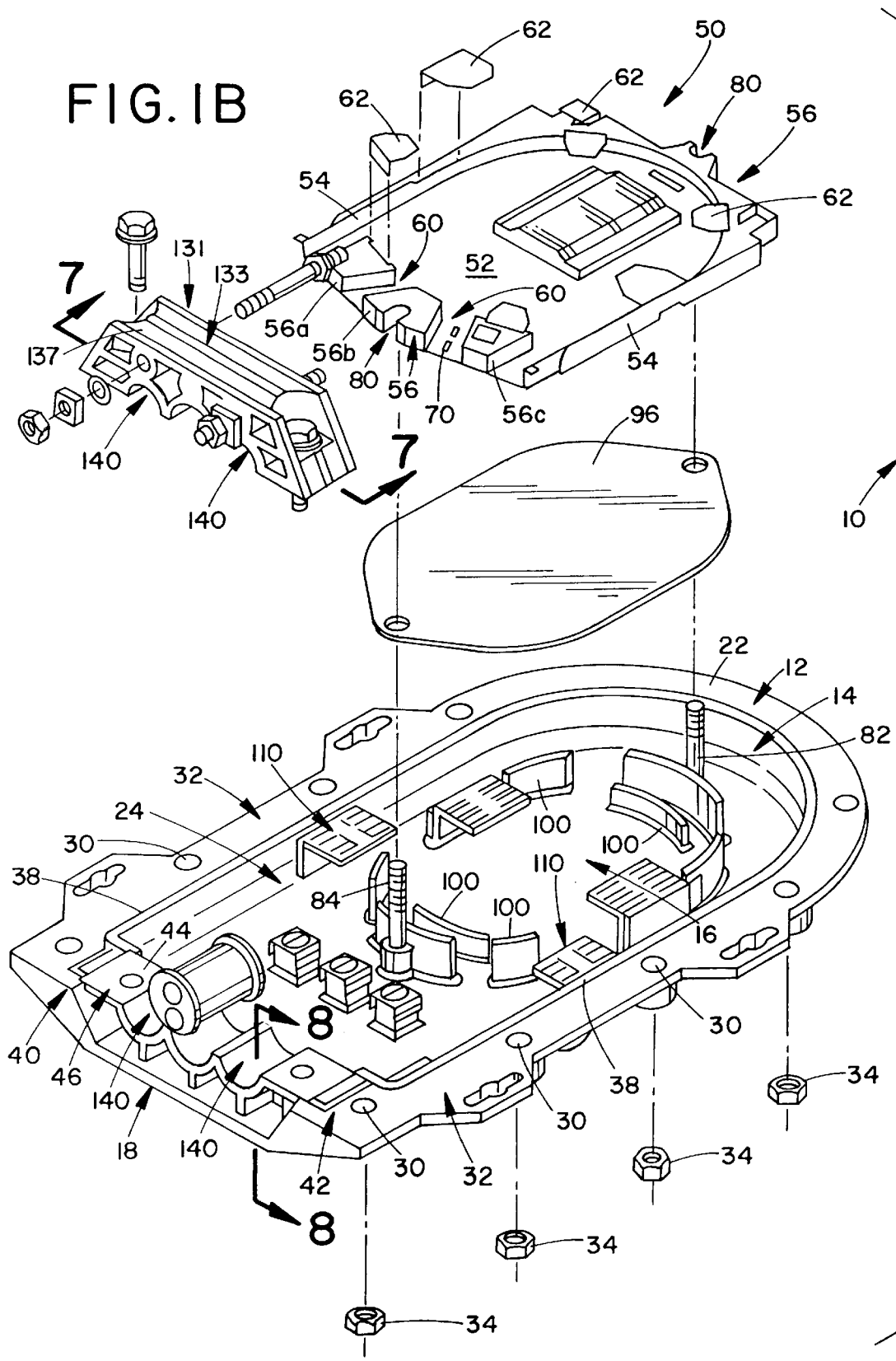

US 6,215,939 B1

OPTICAL FIBER SPLICE CASE WITH INTEGRAL CABLE CLAMP, BUFFER CABLE STORAGE AREA AND METERED AIR VALVE

CROSS-REFERENCE TO RELATED APPLICATION

This application claims the benefit of U.S. Provisional Application Ser. No. 60/091,530, filed Jul. 2, 1998, pending.

BACKGROUND OF THE INVENTION

The subject invention is directed to a waterproof and airtight fiber cable splice enclosure assembly. Assemblies of the type under consideration are particularly well suited for enclosing and housing fiber optic cables such as loose buffer and unitube type cables and will be described with particular reference thereto. However, the apparatus could equally well be used with other types of cables or wires such as, for example, hybrid cables including copper wire, twisted pair wire or co-axial cables.

Many different types of fiber optic cable enclosures are known in the prior art. These prior enclosures are satisfactory to a greater or lesser degree but often have certain defects which make the them inconvenient to use or prevent them from being readily adaptable to changing environments and conditions. One example of an optical fiber splice case that presents a significant improvement over the earlier devices found in the prior art, however, is taught in my earlier U.S. Pat. No. 5,631,933, the teachings of which are incorporated herein by reference. Many of the features described in my earlier patent are present in the novel device described herein to a greater or lesser extent and either directly or by equivalent structure. In addition to providing improvements over my earlier apparatus, the subject optical fiber splice case presents further significant improvements over prior art devices as well.

It is, accordingly, a primary object of the subject invention to provide a cable enclosure assembly that is easy to assemble and use in the field and which has a variety of different sizes with trays and internal supports that form an inner raceway. The volume of the device enables the enclosure to store buffer cable together with unitube cable within a single closure at the same time. In addition, the subject invention provides an enclosure that provides improved pull-out load carrying capability of the cable and further provides for improved air and water tight sealing between the cable and the housing. Still further, the subject invention provides an enclosure that allows for easy manipulation of cable tie-down straps by including an improved internal tie-down clip arrangement that enables the tie-down straps to be manipulated in the field from a front face side without removing the clips. The clip arrangement also eliminates the need to reorient the housing as was the standard practice in the past to gain access under the connection clips to guide the tie-down straps through the clips. A metered air valve is provided to permit the hermetic integrity of the housing assembly while preventing over inflation.

SUMMARY OF THE INVENTION

In accordance with one aspect of the invention, there is provided a housing assembly for enclosing cable splices generally comprising a pair of housing members having main body portions with peripheral clamping flanges extending outwardly therefrom and cooperatively positioned in opposed relationship to be clamped together. The clamping flanges have inner end portions adjacent the main body portions and free outer end portions. A resilient sealing gasket is positioned in a groove formed in one of the housing members and extending peripherally therearound adjacent the inner end portion thereof. An elongate peripherally extending rigid rib member is disposed on the other housing member and is located at a position to engage the sealing gasket when the pair of housing members are brought into their engaged assembled position.

In accordance with a still further aspect of the invention, a pair of spaced-apart elongate rod members extend from the bottom housing member into the space defined by the pair of housing members forming the fiber splice case. The pair of elongate rods are generally disposed in a parallel relationship so that one or more splice trays can be arranged in a stacked relationship to extend between the pair of rods. The trays have axially open end slots which are adapted to receive the pair of rods and, further, are adapted to be guided onto and over the rods. Suitable connecting means on the rods are arranged for releasably clamping the one or more splice trays onto the rods in a fixed manner.

Preferably, and in accordance with a more limited aspect, the rods that extend from the bottom housing member are threaded and the connecting means comprise a strap member releasably joined thereon. By the use of this particular arrangement for supporting the one or more splice trays relative to the interior of the housing assembly, it is possible to merely release the strap member slightly and pivot one end of the splice tray upwardly to remove its slotted end from engagement with the rod at that end. In that way, individual splice trays can be pivoted out of position from the stack for access to the splices therein and for access to a storage compartment below the splice trays. Alternatively, the strap member can be easily completely removed from the threaded rods so that the one or more splice trays can be slid off the rods for complete removal therefrom. In either case, the one or more splice trays can be quickly removed or oriented into a position that enables quick access thereto without removing the entire stack of trays. Thus, replacing or adding additional splices or cables within any tray is possible.

In accordance with yet another aspect of the invention, the preferred form of splice tray includes a molded plastic splice tray having a generally flat rectangular bottom wall and spaced apart upwardly extending side walls joined by a transversely extending end wall. At least one key hole slot connection area is formed in the flat bottom wall of the splice tray to provide an attachment point at which the optical fibers can be connected to the splice tray. The key hole slot connection area is preferably U-shaped enabling one or more cable tie-down straps to be manually manipulated from one side of the splice tray so that the optical cable can be attached to the tray without the need to turn the tray over.

In accordance with yet still another aspect of the invention, a plurality of clip members are provided on the inner wall of one of the housing members for providing a convenient connection area for strapping bundled fiber optic cable directly to the housing. The clip members preferably define a series of alternating grooves and tabs that are spaced apart and staggered in a manner to allow a plurality of tie-down straps to be received within a pair of grooves conveniently from one side of the clip member.

In accordance with another aspect of the invention, the pair of housing members define a splice and storage volume area that is adapted to receive loose buffer cable in addition to unitube type cable within a single fiber splice case. At least one of the housing members includes a series of arcuate walls that define an inner raceway enabling the fiber splice case to store both buffer cable and unitube cable within the closure at the same time. The inner raceway defines an oval cylindrical storage compartment within the enclosed volume space of the fiber closure so that the buffer cable can be separated from the enclosed volume surrounding the compartment and from the splice tray area above the compartment in a compact and convenient fashion.

Still yet in accordance with another aspect of the invention, an end plate member disposed between the first and second housing members includes a convex radius that is adapted to engage the inner lip area of the top housing member. Preferably, the inner lip area is substantially planar or flat in construction. In that way the bowed surface of the convex radius on the end plate member engages the inner lip region of the top housing member in a manner to distribute the engagement forces therebetween unevenly. More particularly, owing to the convex radius of the end plate member, the engagement or sealing forces between the end plate member and the top housing member is greatest in the central area of the lip area to compensate for any potential flexing or malformation of the top housing member that may cause or result in leakage when the housing members of fiber splice case are fastened together in their assembled position.

In another aspect of the invention, an air valve is provided to enable hermetic testing of the housing assembly. The air valve is preferably a one-way check valve and includes a metered orifice for limiting the rate at which the housing assembly can be pressurized. This prevents over-inflation and possible damage or explosion of the housing.

Still further, an improved cable entry and connection profile is provided to enable better cable to enclosure sealing characteristics and, further, to increase the cable pull-out strength of the enclosure. In its preferred form, the entry and connection profile is a one of a concave or convex form, or a combination of both. Preferably, the entry and connection profile is substantially and uniformly concave or convex around the periphery of the one or more cable entry holes provided on the enclosure. Alternatively, the cable entry and connection profiles can be formed to include multiple continuous concave or convex regions spaced apart longitudinally along the cable entry hole provided into the enclosure.

Other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, a preferred embodiment of which will be described in detail in this specification and illustrated in the accompanying drawings which form a part of hereof, and wherein:

FIGS. 1A and 1B show an exploded isometric view of a preferred embodiment of a housing assembly intended for use in storing fiber optic cable and fiber optic cable splices;

DETAILED DESCRIPTION OF THE PREFERRED EMBODIMENT

Figure 1A:
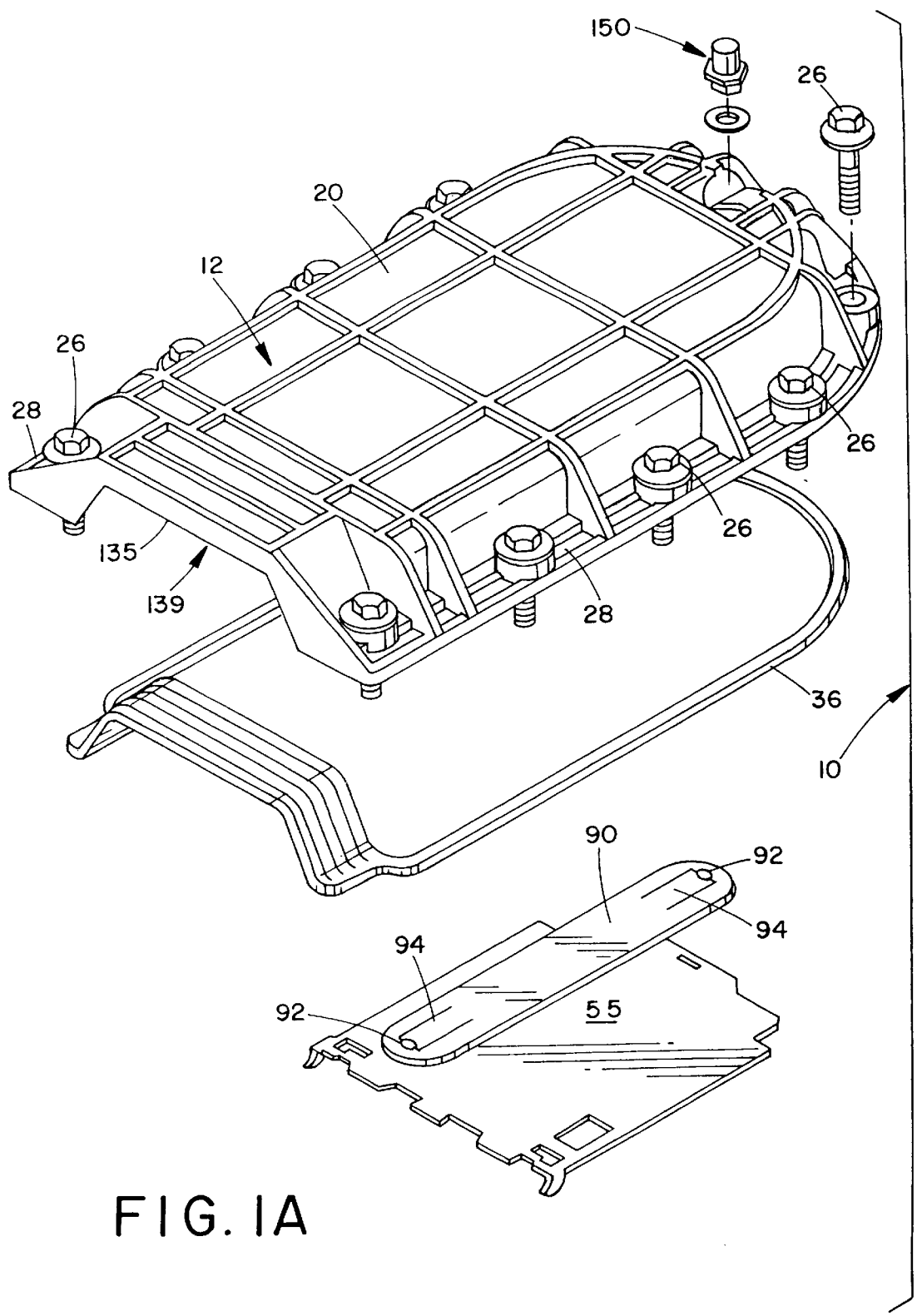
Figure 2:
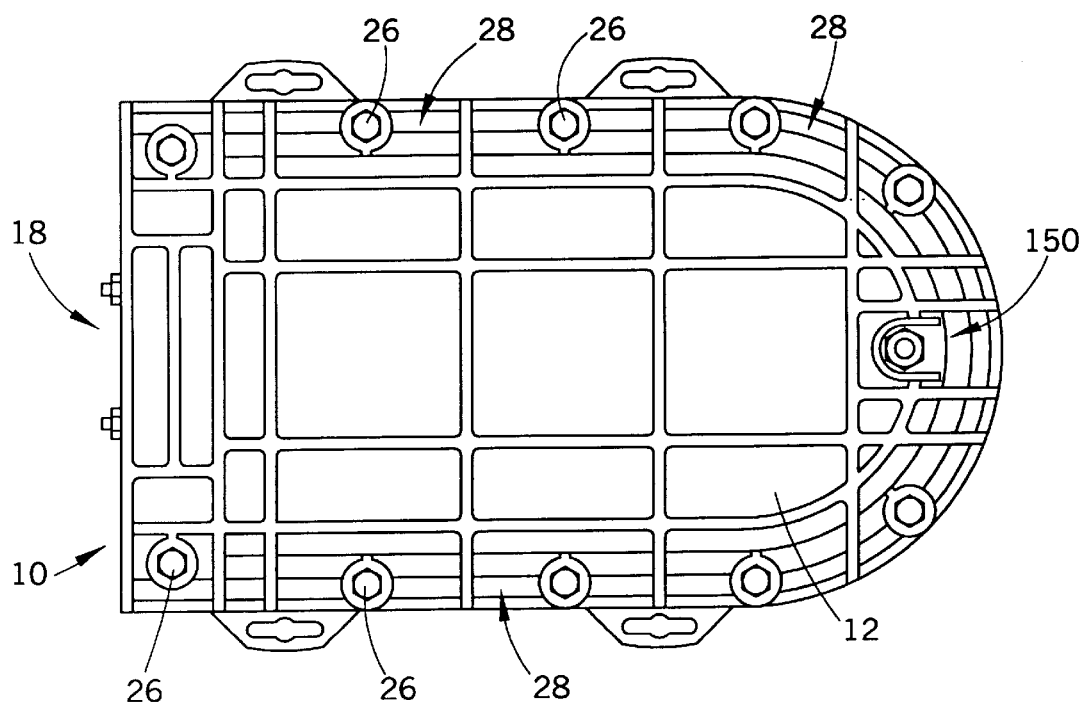
FIG. 2 is an elevational top plan view of the housing assembly of FIGS. 1A and 1B.
Figure 3:
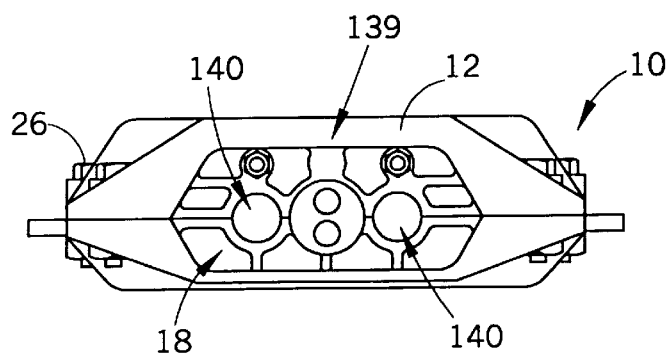
FIG. 3 is an elevational end view of the housing assembly of FIGS. 1A and 1B.
Figure 4:
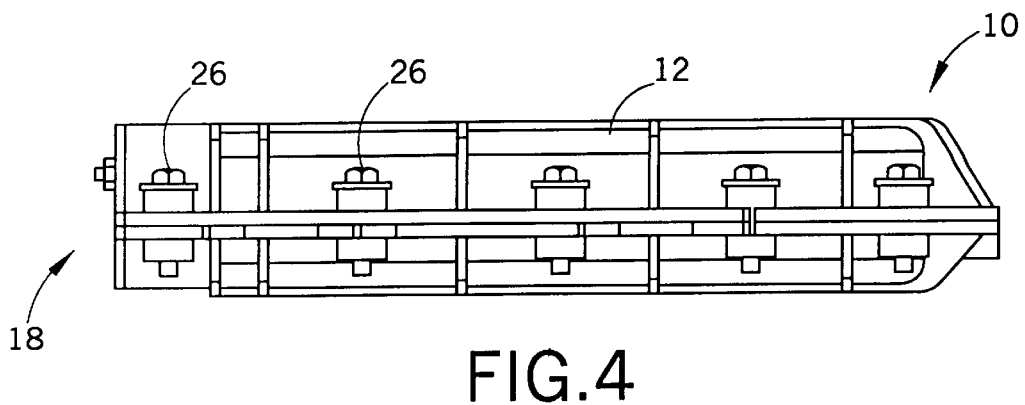
FIG. 4 is an elevational side view of the housing of FIGS. 1A and 1B.

Referring now to the drawings wherein the showings are for the purposes of illustrating the preferred embodiment of the invention only and not for purposes of limiting same, the overall construction of the subject optical fiber splice case assembly 10 can best be understood by reference to FIGS. 1A through 4. As illustrated therein, the splice case assembly 10 comprises a housing assembly 12 that houses and encloses a splice tray support area 14 and a buffer cable storage compartment 16 as shown. The housing assembly 12 is generally formed by a pair of closely similar, opposed main housing or body members 20 and 22 which are joined together in a sealed clamping relationship to define a flat truncated oval-shaped central splice case volume area 24.

The top housing member 20 carries a set of regularly spaced apart captive bolt members 26 arranged in spaced apart relationship along an outwardly extending flange 28 as illustrated. A set of engagement holes 30 are formed through an outer flange 32 of the bottom housing member 22 in a manner and at locations adapted to correspond to the positions of the captive bolt members on the top housing member 20. In that way, the top and bottom housing members 20, 22 together with the bolt members 26 can be easily brought together into their final assembled position shown in FIGS. 2 through 4. A set of connection nuts 34 are adapted to engage the distal threaded ends of the captive bolt members 26 that extend through the opposed flanges 28, 32 so that the top and bottom housing members can be appropriately fastened together and to establish and maintain the proper seal between the housing halves.

In order to provide for a waterproof and air tight splice case assembly, a resilient sealing gasket member 36 is provided as illustrated. Preferably, the sealing gasket member is formed of a continuous loop of a sealing material that is readily bendable and moldable into various shapes including the shape illustrated in FIG. 1A to conform to the shape of the housing halves 20, 22. A continuous groove (not shown) is formed along the underside of the flange 28 extending outwardly from the top housing member 20. The groove is adapted to receive the sealing gasket using a glue or friction fit so that the gasket 36 can be arranged in position and loosely connected to the top housing member prior to final assembly of the splice case halves. This makes it easier for lone personnel to re-assemble the splice case after maintenance or the like without the use of complicated fixtures or the like.

In addition to the sealing gasket member 36 described above, as an added measure to provide for fluid and air tight integrity, an elongate continuous raised rib member 38 is disposed on the lower flange 32 of the bottom housing member 22 at a position substantially as shown in FIG. 1B. The raised rib member is adapted to drive against the sealing gasket when the top and bottom housing members 20, 22 are brought into their engaged assembled position shown in FIGS. 2 through 4. The gasket is compressed slightly thereby to ensure that no gaps are left between the housing halves.

Lastly in connection with the raised rib member, a pair of angled rib regions 40, 42 are arranged at the terminal ends of the rib member near the cable entry side 18 of the housing member as shown. Each of the angled rib regions includes a pair of spaced apart parallel radiused ribs that taper downwardly to enable the use of a strip of sealing tape 44 to be used along the top surface of the bottom housing member cable connecting area 46. The downward taper prevents the sealing tape 44 from becoming perforated by sharp corners or edges.

As previously mentioned, one or more splice trays 50 are positioned within the central volume 24 of the subject splice case assembly 10. Although the splice trays could have a variety of configurations, the typical and preferred form for the trays in the subject embodiment is shown best in FIG. 1B. As illustrated there, the splice tray 50 generally comprises a molded plastic tray member having an outer peripheral size and shape which is rectangular and generally corresponds to the size and shape of the space available in the central volume 24. The tray generally includes a flat bottom wall 52, a pair of upwardly extending opposite side walls 54, and a set of end walls 56. On one edge of the splice tray, the end wall is partitioned into a set of discontinuous end wall portions 56a, 56b, and 56c. The spacing or gaps formed between the end wall portions provides a set of cable entrance areas 60 that enable cable ends to pass therethrough between the flat bottom wall of the splice tray and a pivotable hinged lid 56 (FIG. 1) when the lid is in its closed and assembled configuration.

In order to assist in restricting cable movement within the splice tray and to provide for an orderly arrangement of cable leads within the splice tray, a set of retainers or capture tabs 62 are releasably retained in position by the side and end walls 54, 56 of the splice tray in the manner shown. Each of the capture tabs have a downwardly extending leg portion that is releasably received into a corresponding longitudinally extending groove formed along each of the splice tray end and side walls. Further, each of the capture tabs includes an inwardly extending retainer portion that is adapted to overlay the flat bottom wall of the splice tray so that cable lead portions can be routed between the retainer portions of the capture tabs and the flat bottom wall of the splice tray. In addition, to further enable the orderly management of cable lead at the splice tray, the flat bottom wall of the tray is provided with a key hole slot connection area 70 shown generally in FIG. 1B but best illustrated in FIG. 5. Although only a single key hole slot area 70 is shown in the drawings, multiple key hole slot areas can be used advantageously in accordance with the invention. The slot areas are adapted for location anywhere within the subject splice case assembly, such as, for example, on one or more of the capture tabs 62, or on any other component within the splice case assembly.

Figure 5:
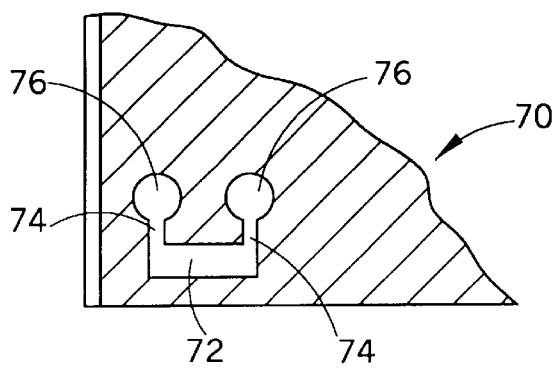
FIG. 5 is an enlarged plan view of the circled area of FIGS. 1A and 1B to show the key hole slot connection area used to fasten tie-down straps to the splice tray.

Turning now to FIG. 5, the key hole slot connection area 70 is defined by an elongate transfer channel 72 that is intercepted by a plurality of transfer grooves 74. Each of the plurality of transfer grooves 74 are in turn joined to a corresponding plurality of locating holes 76. In the preferred form illustrated, a single pair of transfer grooves 74 connect a single pair of locating holes 76 to the transfer channel 72. It is to be noted, however, that multiple transfer grooves could be provided to connect one or more associated transfer channels to a corresponding set of multiple locating holes as needed in alternative embodiments of the subject key hole slot connection area. As an example, a first transfer channel can be connected to three or four or more transfer grooves and a second transfer channel can be connected to a pair of transfer grooves. The range of alternatives is without limit.

The key hole slot connection area 70 illustrated in FIG. 5 is extremely useful for connecting a bundle of optical fibers to the flat bottom wall 52 of the splice tray using resilient plastic tie-down straps common in the industry. Additional key hole slot areas located elsewhere in the splice case assembly such as on one or more of the capture tabs 62, are extremely useful for connecting fiber bundles to the tabs or to the other locations within the assembly as needed.

In operation, the tie-down strap is first formed into a loop away from the splice tray. The free end of the loop is then in turn passed through the transfer channel 72 from the top side of the splice tray. In that position, free end of the loop extends through the transfer channel. In that way, a portion of the loop is open on both the bottom and top sides of the splice tray owing to the tie-down strap extending more or less midway or partially through the transfer channel 72. Next, the tie-down strap loop is slid laterally relative to the transfer channel 70 along the transfer grooves 74 (upwardly in FIG. 5) until the tie-down strap loop becomes loosely held by the locating holes 76.

Preferably, the loop in an unbiased condition has an overall diameter that is larger than the distance between the pair of locating holes. The inherent resiliency of the tie-down strap is thereby exploited so that the locating holes can be used to "catch" the loop and hold it loosely in place. In that position, the technician can ungrip or release the tie-down strap. Thereafter, the strap is held in place initially by the loose interference between the locating holes 76 and the tie-down strap loop. After the appropriate optical cable leads have been installed into or out from the splice tray through the cable entrance areas 60 and through the tie-down strap loop, the technician next then merely needs to pull on the loose end of the tie-down strap to fasten the bundle of optical fiber to the splice tray bottom wall thus securing the optical fiber to the splice tray. When pulled, the loop closes down around the material between the pair of locating holes until the tie-down strap is tight.

Turning back to FIGS. 1A and 1B and further with regard to the connection and placement of the splice tray 50 within the central volume 24, the end walls 56 of the splice tray define a set of opposed engagement slots 80 that are positioned and oriented to engage a pair of spaced apart elongate threaded rod members 82, 84 extending upwardly from the bottom housing member 22 as shown. Preferably, the rod members are threaded posts.

A suitable resilient plastic strap 90 is arranged for connection between the upper ends of the rod members 82, 84 and functions to clamp the storage tray 50 down in its located relationship relative to the bottom housing member 22. Further, the strap functions to maintain the lid 55 of the storage tray in its downwardly oriented closed position. As illustrated, the strap 90 includes end openings 92 having resilient tabs 94 arranged to extend into engagement with the threaded rod members 82, 84 and releasably lock the strap thereto. The strap is easily released, however, merely by lifting the tabs or by tugging at the strap ends so that the strap can be removed from the rod members by sliding it off. Although not illustrated in FIGS. 1A and 1B, it is contemplated that the end openings and/or the resilient tabs of the strap member can be integrated into the top lid 55 of the splice tray, into the engagement slots 80 formed in the end walls 56 of the splice tray or, alternatively, formed in an inner closure cover 96. In the preferred embodiment illustrated, the closure cover is adapted to separate the splice tray 50 from the buffer cable storage compartment 16.

With continued reference to FIGS. 1A and 1B, the bottom housing member 22 includes a set of arcuate walls 100 that define a substantially oval cylindrical buffer cable storage compartment 16 as shown. The buffer cable storage compartment is useful to store loose buffer cable or, alternatively, to store unitube type fiber optic cable to prevent damage thereto. As can be seen from the figure, the buffer cable storage compartment 16 is quite well protected by the combination of the inner closure cover 96 and the arcuate walls 100 when the closure cover is engaged onto the rod members 82, 84.

To further help facilitate routing optical fibers into and out of the splice tray 50, a set of tie-down strap clip tabs 110 are disposed within the central volume 24 of the housing assembly at multiple various locations. Preferably, the set of tie-down strap tabs 110 are arranged within the housing as best shown in FIG. 1A.

Figure 6:
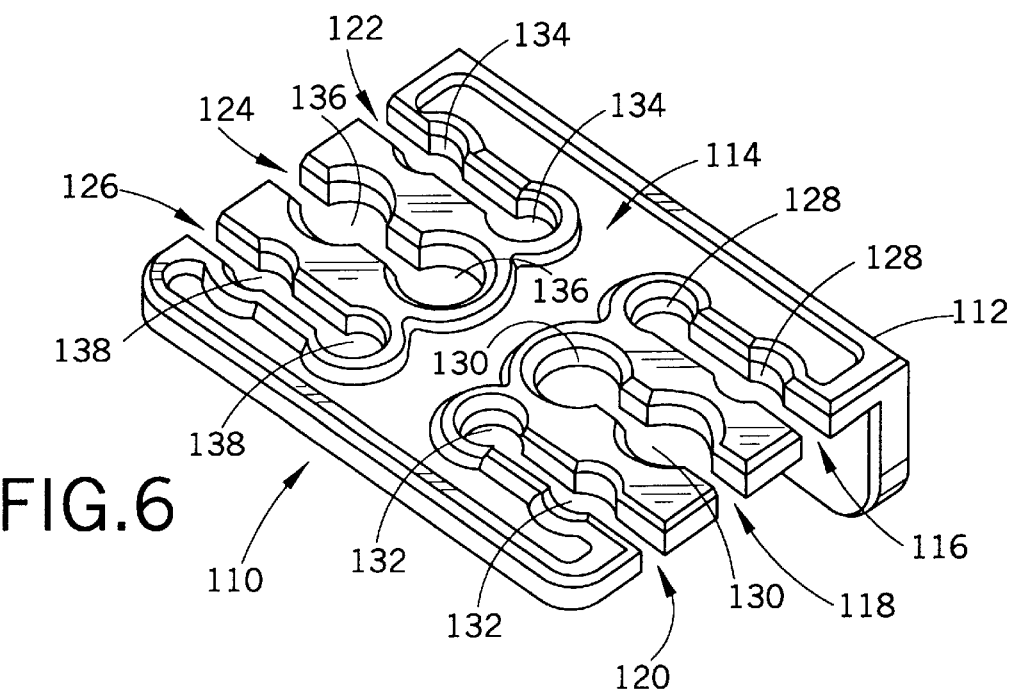
FIG. 6 is an isometric view of a novel internal tie-down clip member disposed in the housing assembly of FIGS. 1A and 1B.

FIG. 6 illustrates a preferred form of the subject tie-down strap clip tab 110 in detail. Referring now to that Figure, the clip tab includes an engagement edge 112 that is adapted to be disposed in a connected relationship onto the outer edge of the bottom housing member 22 in a manner such as shown in FIG. 1A. The main body portion 114 of the clip tab extends substantially perpendicularly from the edge of the bottom housing member into the central volume 24 of the subject splice case assembly so that the spaced apart rows of transfer grooves 116 through 126 can be readily accessed. As shown best in FIG. 6, each of the transfer grooves includes a set of tie-down strap locating holes 128 through 138.

The utility and manner of using the tie-down strap clip tab 110 is substantially similar to that described in connection with the key hole slot connection area 70 described above. However, with regard to the structure of the tab, it is to be noted that the right and left central transfer grooves 118, 124 are substantially wider than the remaining outer transfer grooves as can be seen in FIG. 6. In addition, the central locating holes 130, 136 corresponding to the right and left center transfer grooves 118, 124 are similarly substantially larger than the remaining locating holes. This is the preferred form of the tie down strap clip tab 110 because the central transfer grooves 118, 124 are adapted to accommodate multiple side-by-side tie-down strap loops. As an example, a first tie-down strap can be looped through the first and second transfer grooves 116, 118, and simultaneously, a second tie-down strap can be looped between the second and third transfer grooves 118, 120, respectively. Accordingly, the center transfer grooves 118, 124 are appropriately sized to receive multiple back-to-back tie-down strap loops therein.

In use of the subject tie-down strap clip tab 110, the technician merely forms a single loop from a standard resilient plastic tie-down strap and then passes the loop laterally onto the clip tab between any adjacent pair of transfer grooves such as, for example, between the first and second transfer grooves 116, 118. Preferably, the tie-down strap locating holes 128, 130 provided on the first and second transfer grooves are used to loosely hold the tie-down strap loop into position while the operator's hands are free to manipulate one or more fiber optic cables or bundles through the loop until the suitable connections have been made in the splice tray or to perform other service operations. After the technician is finished with the task at hand, the loose end of the tie-down strap need only be tightened to snug the bundle contained in the strap loop to the clip member 110.

Figure 7:
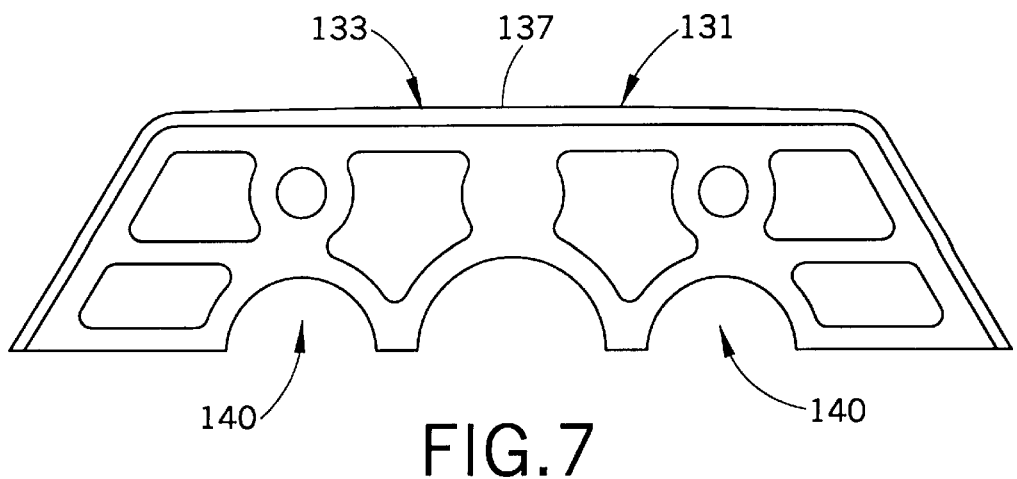
FIG. 7 is an elevational end view of the end plate member of the subject housing assembly shown in FIGS. 1A and 1B.

Turning next to FIGS. 1A and 1B and 7, the subject splice case assembly 10 includes an end plate member 131 disposed at the cable entry side 18 of the housing as shown. In its preferred form, the end plate member 131 includes an overall convex outer radius surface (FIG. 1A) 133 that is adapted to engage the inner lip area 135 of the top housing member 20 having a similarly shaped corresponding surface. Preferably, however, the overall convex shape of the inner lip area is formed by a set of substantially planar or flat surface portions. In that way, the bowed surface 137 of the concave radius 133 on the end plate member 130 engages the substantially planar inner lip region of the top housing member in a manner to distribute engagement forces therebetween unevenly. More particularly, owing to the concave radius of the end plate member 131, the engagement or sealing forces between the end plate member and top housing member is greatest in the central area 139 (FIG. 1A) of the lip area to compensate for any potential flexing or malformation of the top housing member that may cause or result in leakage when the splice case is fastened together in its assembled position.

Figure 8A:
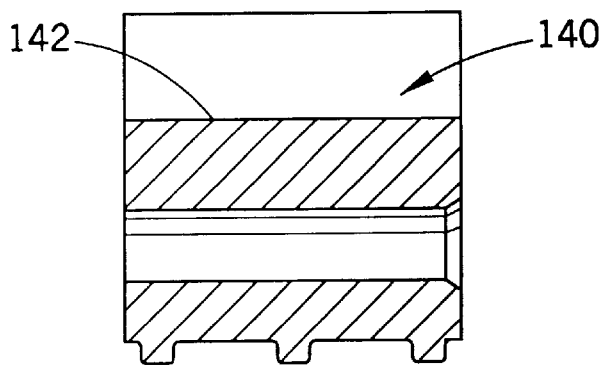
FIG. 8a is an enlarged cross-sectional view taken on line 8—8 of FIGS. 1A and 1B illustrating a first cable entry and connection profile type.
Figure 8B:
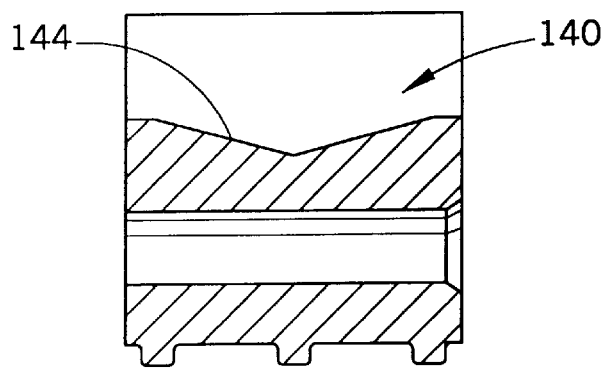
FIG. 8b is an enlarged cross-sectional view taken along 8—8 of FIGS. 1A and 1B illustrating a second cable entry and connection profile type in accordance with the invention.
Figure 8C:
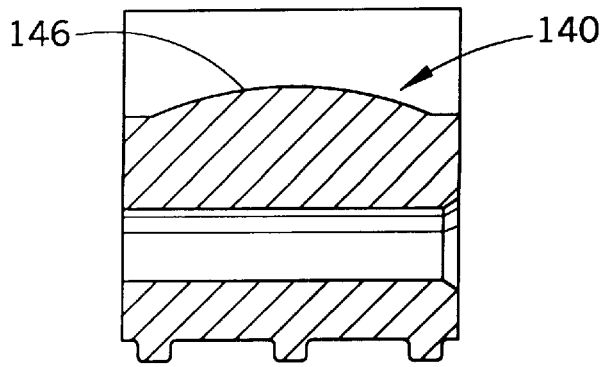
FIG. 8c is an enlarged cross-sectional view taken along 8—8 of FIG. 1 illustrating a third preferred cable entry and connection profile type in accordance with the invention.

Turning next to FIGS. 1A, 1B and 8a–8c, the subject splice case assembly further includes a set of connection openings 140 to allow for multiple cables to enter and exit the housing assembly through the cable entry side 18 thereof. In FIG. 8a, the connection opening 140 is formed through the housing assembly using a smooth bore surface 142. A concave cross-sectional surface 144 is shown in FIG. 8b and, further, a convex cross-sectional surface 146 is illustrated in FIG. 8c. For any given application, one or more of the above-described cross-sectional connection opening surfaces can be utilized to effect suitable enclosure sealing performance characteristics and cable pull-out characteristics as needed. In addition, the cable entry and connection profiles can be formed to include multiple continuous concave (FIG. 8b) or convex (FIG. 8c) regions spaced apart longitudinally along one or more of the connection openings 140 provided in the enclosure.

FIGS. 1A, 1B, 2, 9a, and 9b illustrate a novel metered air valve 150 in accordance with the present invention. As described above, in order to provide for a water proof and air tight splice case assembly, a resilient sealing gasket member 36 is arranged between the opposing housing member halves 20, 22. In addition, strips of sealing tape 44 are used on the under side of the end plate member 130 and along the top surface of the bottom housing member 22. In order to ensure that the subject fiber splice case is hermetically sealed, a metered air valve 150 as shown in the figures is used to introduce pressurized air into the volume defined by the connected housing members.

After the housing halves 20, 22 are brought together in their intermated relationship and each of the connection openings 140 is either filled with a blank plug or with optical fiber bundles, pressurized air, preferably 5 psi maximum, is introduced into the closed housing through the metered air valve 150. In its preferred form, the air valve is a one way check valve so that air can flow into the housing through the valve but is prevented from a reverse flow. Upon filling the enclosure to the recommended air pressure, a close scrutiny on the pressure, preferably through use of an associated air pressure valve, or the like, reveals whether the enclosure is hermetically sealed. If the observed pressure remains static during the observation time, it can be assumed that the enclosure is adequately sealed. However, housing leaks will be evidenced by a decrease in pressure.

Figure 9A:
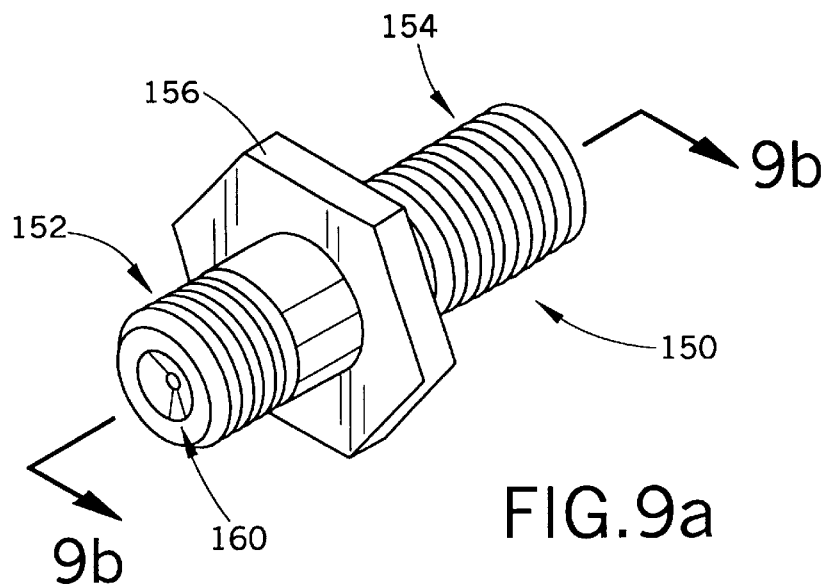
FIG. 9a is an isometric view of a novel metered air valve in accordance with the present invention for hermetic testing the subject splice housing assembly.
Figure 9B:
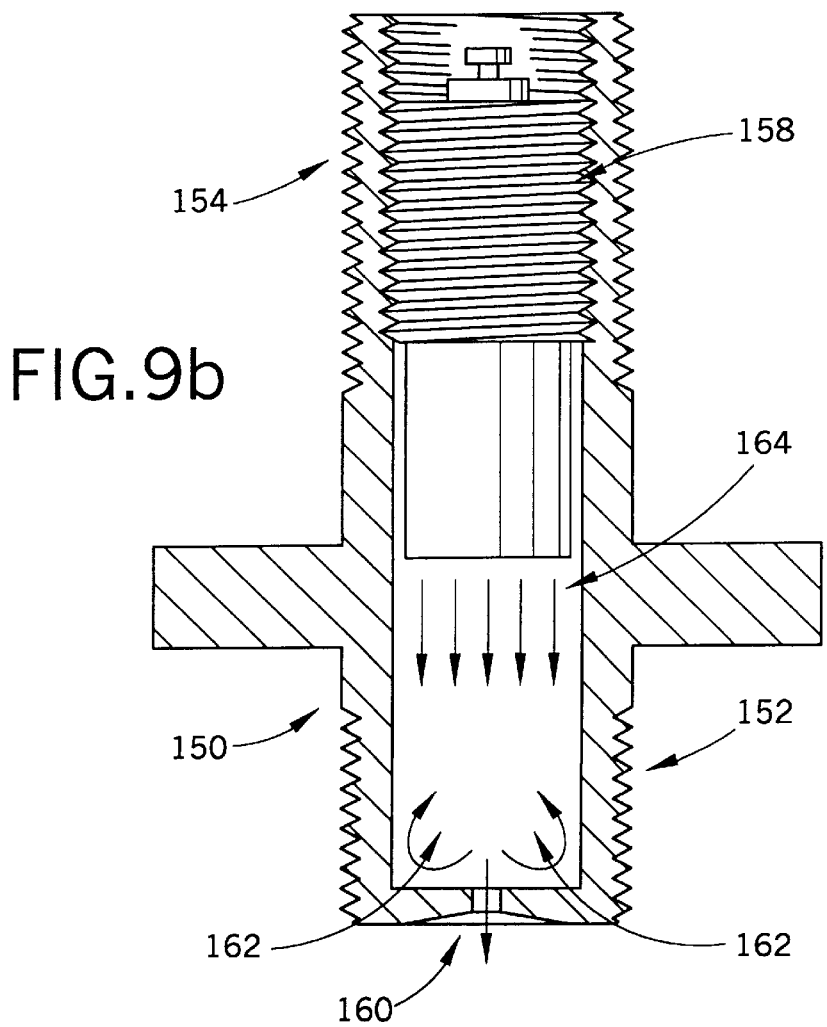
FIG. 9b is an enlarged cross-sectional view taken on line 9b—9b of FIG. 9a; and, FIGS. 10a and 10b show elevational end views of an alternative end plate member providing a pressure relief vent to prevent damage to the subject housing assembly during pressure testing.

Turning now to FIGS. 9a and 9b, the subject metered air valve 150 is shown in greater detail. Overall, the air valve includes a threaded end portion 152 and an access end 154. The threaded end portion 152 is adapted to engage a set of corresponding internal threads arranged on the upper housing member 20. A nut flange 156 is provided on the air valve so that it can be easily threaded into the upper housing half 20 using a wrench or other suitable tools.

The access end 154 of the air valve includes an air stem assembly 158 as shown best in FIG. 9b. Preferably, the air stem assembly is shaped and functions in a manner well known in the art such as, for example, as the air valve stems of automotive or bicycle tires.

Of particular importance to the subject metered air valve 150, however, the threaded end portion 152 includes a metered orifice 160 shown on end in FIG. 9a and in cross section in FIG. 9b. The pressure of the air source and the size of the orifice determine the rate of flow of air into the volume of the housing. Preferably, the metered orifice is substantially cylindrical and has a diameter of 0.024 inches +/−0.003 although other sized openings can be used as well. Larger openings enable a faster flow and, conversely, smaller openings restrict the flow to slower rates. As shown best in FIG. 9b, the metered orifice creates air turbulence 162 in the entering air stream 164. The metered orifice 160 is advantageous in the subject splice case for controlling the volume rate of air that is permitted to enter the closed space defined by the housing members. operationally, the orifice prevents excessive amounts of air from entering into the enclosure at a fast rate. This aids in the process of testing the hermetic integrity of the enclosure and substantially eliminates overinflation of the housing assembly.

Figure 10A:
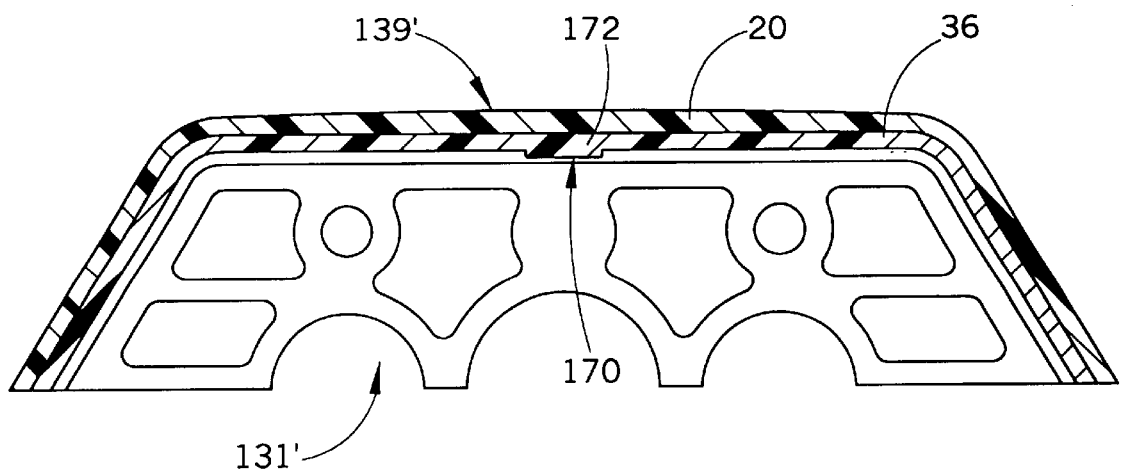
Figure 10B:
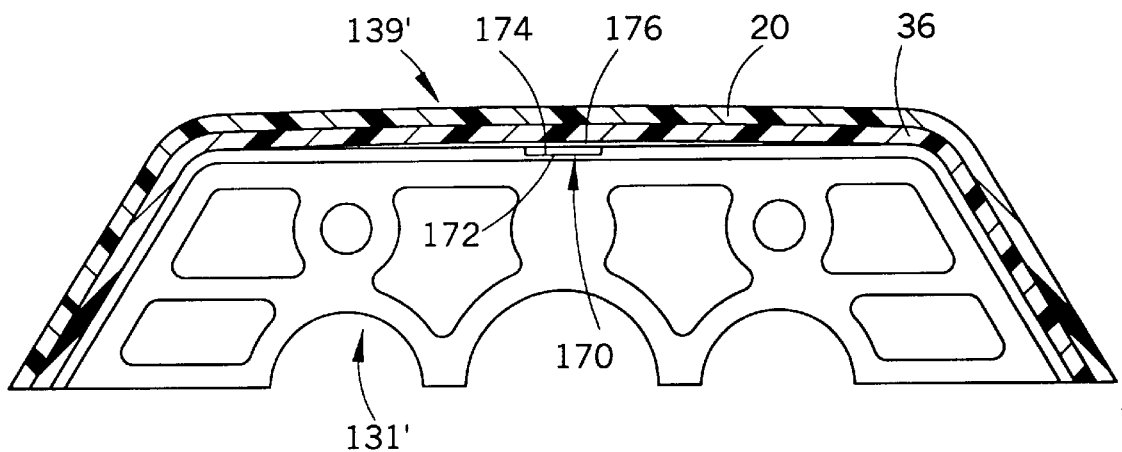

FIGS. 10a and 10b show sectional end views of an alternative end plate member 131' providing a pressure relief vent 170 to prevent over pressurization of the subject housing assembly. As noted above, the metered orifice in the air valve 150 essentially controls the rate of flow of pressurized air permitted to enter into the subject splice case during the preliminary steps of testing for hermetic integrity of the enclosure. If the external source of pressurized air remains connected to the metered air valve for extended periods of time, however, over inflation of the splice case could occur causing an explosion or other damage to the housing assembly.

The alternative end plate member 131' provides a pressure relief vent means to prevent over pressurization and subsequent resultant damage to the subject housing assembly. In its preferred form as shown in FIGS. 10a and 10b, the alternative end plate member 131' includes an overall convex outer radius surface that is adapted to engage the inner lip area of the top housing member 20 having a similarly shaped corresponding surface. A bowed surface of the convex radius on the end of the plate member 131' compresses the gasket member 36 against the substantially planar inner lip region of the top housing member in a manner to distribute the engagement forces therebetween unevenly. More particularly, owing to the convex radius of the end plate member 131', the engagement or sealing forces between the end plate member and the top housing member is greatest in the central area 139' to compensate for any potential flexing or malformation of the top housing member that may cause or result in leakage when the splice case is fastened together in its assembled or closed position illustrated in FIG. 10a.

The alternative end plate member 131' includes, in the central area 139', a molded relief groove 172 that extends substantially along the entire width of the end plate member 131' in a direction transverse relative to the face of the plate member 131'. The relief groove 172 enables fluid communication between the interior portions is of the assembled splice case and the outer atmosphere when the components are in relative position illustrated in FIG. 10b. As noted above, the engagement or sealing forces between the end plate member 131' and the top housing member is greatest in the central area 139'. This causes the resilient gasket member 36 to completely fill the gap defined by the relief groove 172 thereby hermetically sealing the splice case enclosure as shown in FIG. 10a.

When the enclosure is inflated using the metered air valve 150 in a manner described above, however, the upper housing member 20 tends to bow outwardly primarily in the central area 138' owing to the pressure differential between the internal volume of the splice case assembly and outer atmosphere. As the upper housing member 20 begins to flex and bow outwardly, the compressive forces exerted on the gasket member 36 reduce. At a predetermined relative internal splice case pressure, the gasket member 36 separates slightly from a valley portion 174 of the relief vent 170. The separation between the gasket member and the molded relief groove creates a pressure relief passageway 176 for allowing the pressurized fluid within the splice case enclosure to "bleed off" or escape at a predefined rate thus preventing explosion or other damage to the splice case.

It is readily apparent that the relief vent 170 provided in the end plate member 131' is inherently self-regulating. More particularly, as the relative internal pressure within the splice case assembly increases, the upper housing member 20 tends to flex and bow outwardly by a greater amount. A larger housing bow produces a larger pressure relief passageway 176. As the relative pressure decreases, the bow of the upper housing member 20 is less pronounced, thus in turn leading to a reduced pressure relief passageway area. Actuation of the air stem assembly 158 enables pressure equalization between the splice case volume and atmosphere whereupon the passageway 174 closes sealing the splice case.

In one form of the relief vent, suitable whistle producing members (not shown) are disposed therein in a manner to generate an audible indicia that a predetermined relative pressure differential is established prior to testing for hermetic integrity. The predetermined relative pressure differential threshold at which the pressure relief passageway 176 is opened is controlled based upon a combination of the physical dimensions of the relief vent 170, the material forming the gasket 36, and the size, shape, and material forming the top housing member 20. In accordance with the present invention, these parameters are selected empirically to provide a 15 p.s.i. predetermined pressure threshold.

The invention has been described in connection with the preferred embodiments. Obviously, alterations and modifications can be made by those skilled in the art upon reading and understanding the subject invention and without departing from the spirit and scope of the claims appended hereto.

Having thus described the preferred embodiment, the invention is now claimed to be:

1. An optical fiber splice case comprising:
   a first set of intermateable housing members being selectively sealingly clamped to each other to define a first sealed storage space; and,
   an air valve for directing a flow of air into the sealed storage space of the optical fiber splice case, the air valve being adapted to meter the flow of air into the sealed storage space to below a predetermined threshold air flow rate.

2. The optical fiber splice case according to claim 1 wherein said air valve includes a metered orifice.

3. The optical fiber splice case according to claim 2 wherein said air valve includes a check valve for permitting said flow of air into the sealed storage space of the optical fiber splice case and preventing a flow of air out of said sealed storage space.

4. The optical fiber splice case according to claim 3 wherein said metered orifice is a substantially cylindrical passageway having a diameter of about 0.024 inches.

5. An optical fiber splice case according to claim 2 further including a pressure relief vent adapted to regulate air pressure accumulated within the first sealed storage space to a first pressure less than a predetermined pressure threshold.

6. The optical fiber splice case according to claim 5 wherein said pressure relief vent comprises a relief groove defined in one of the first set of intermateable housing members and a gasket member held between said set of intermateable housing members in said relief groove.

7. The optical fiber splice case according to claim 6 wherein at least one of said set of intermateable housing members is adapted to bow outwardly in response to said air pressure accumulated within the first sealed storage space to permit said gasket member to separate from said relief groove thereby opening a pressure relief passageway to vent said optical fiber splice case.

8. The optical fiber splice case according to claim 7 wherein said one of said set of intermateable housing members is adapted to relax inwardly in response to a decrease in said accumulated air pressure within the first sealed storage space to permit said gasket member to lodge in said relief groove thereby closing said pressure relief passageway to hermetically seal the optical fiber splice case.

9. An optical fiber splice case comprising:
   at least one end plate member having a passageway adapted to receive an optical fiber bundle therethrough;
   a first set of housing members contoured to enclose the at least one end plate member and being releasably and sealingly clamped to each other and to the at least one end plate member to define a first storage volume;
   a pair of spaced apart rods carried by a first one of said housing members;
   at least one splice tray extending between the pair of rods, the at least one splice tray having end slots which receive and are guided on the rods;
   a set of wall portions extending from said first one of the housing members toward said at least one splice tray, the set of wall members defining a buffer cable storage space within the set of wall portions for storage of buffer cable portions of the optical fiber bundle within the optical fiber splice case between the at least one splice tray and the first one of the housing members, and defining an auxiliary cable storage space around the buffer cable storage space for storage of an auxiliary length of said optical fiber bundle within the optical fiber splice case.

10. The optical fiber splice case according to claim 9 wherein:
    the at least one end plate member includes a single end plate member; and,
    the first set of housing members includes first and second housing members adapted to enclose the single end plate member an are adapted to sealingly clamp to each other and to the single end plate member to define said first storage volume.

11. The optical fiber splice case according to claim 10 wherein the passageway of the single end plate member includes a set of connection openings to allow said optical fiber bundle to extend into said housing assembly, the set of connection openings have a one of a smooth base surface, a concave cross-sectional surface and a convex cross-sectional surface.

12. The optical fiber splice case according to claim 9 wherein said set of wall portions define a substantially oval wall extending from said first one of the housing members toward said at least one splice tray, the substantially oval wall defining a substantially oval buffer cable storage space within the substantially oval wall for storage of said buffer cable portions and defining a substantially annular auxiliary cable storage space around the substantially oval buffer cable storage space for storage of said auxiliary length of said optical fiber bundle.

13. The optical fiber splice case according to claim 12 wherein said set of wall portions define a discontinuous substantially oval wall to enable portions of optical fiber bundle to extend between said substantially oval buffer cable storage case and said substantially annular auxiliary cable storage space.

14. The optical fiber splice case according to claim 9 further comprising an air valve for directing a flow of air into the first storage volume of the optical fiber splice case, the air valve including a metered orifice adapted to meter said flow of air into the first storage volume to below a predetermined threshold.

15. The optical fiber splice case according to claim 14 further comprising at least one tie-down strap clip member joined to one of said set of housing members, the at least one tie-down strap clip member having a main body portion extending in a plane spaced apart from said one of said set of housing members, the main body portion defining a set of spaced apart transfer grooves adapted to slidably receive an associated tie-down strap onto the clip member.

16. The optical fiber splice case according to claim 15 wherein each of the spaced apart transfer grooves includes an enlarged locating hole adapted to engage the associated tie-down strap and hold the tie-down strap onto the clip member when the tie-down strap is tightened.

17. The optical fiber splice case according to claim 9 further including a pressure relief vent adapted to regulate air pressure accumulated within said first storage volume to a first pressure less than a predetermined pressure threshold.

18. The optical fiber splice case according to claim 17 wherein said pressure relief vent comprises a relief groove defined in said at least one end plate member and a gasket member held between said first set of housing members and said at least one end plate member in said relief groove.

19. An optical fiber splice case comprising:
    at least one end plate member having a passageway adapted to receive an optical fiber bundle therethrough;

first and second housing members contoured to enclose the at least one end plate member and being releasably and sealingly clamped to each other and to the at least one end plate member to define a first storage volume;

at least one key hole slot connection area cooperative with an associated tie-down strap for connecting the associated optical fiber bundle to a one of the first and second housing members.

20. The optical fiber splice case according to claim 19 wherein the at least one key hole slot connection area includes;

an elongate transfer channel adapted to receive a free looped end of the associated tie-down strap therethrough; and first and second spaced apart transfer grooves continuous with the transfer channel and arranged generally transverse to the transfer channel, each of the first and second transfer grooves being adapted to receive a one loop portion of the free loop end of the associated tie-down strap therethrough.

21. The optical fiber splice case according to claim 20 wherein each of the transfer channels includes an enlarged locating hole adapted to connect the associated tie-down strap onto the at least one key hole slot connection area when the tie-down strap is tightened.

22. In combination with a housing defining a first sealed storage space, an air valve assembly for directing a flow of air into the sealed storage space, the air valve assembly being adapted to regulate the flow of air into the sealed storage space to a first flow rate less than a predetermined threshold air flow rate.

23. The combination according to claim 22 wherein said air valve assembly includes a metered orifice.

24. The combination according to claim 23 wherein the metered orifice is adapted to generate an air turbulence in said air valve assembly to regulate the flow of air into the sealed storage space to said first flow rate.

25. The combination according to claim 24 wherein the air valve assembly includes an air stem assembly for permitting said flow of air into the sealed storage space and preventing a flow of air out of said sealed storage space.

26. The combination according to claim 25 wherein the air stem assembly is a check valve.

27. The combination according to claim 26 wherein said metered orifice is a passageway having a diameter substantially 0.024 inches.

28. The combination according to claim 27 wherein said housing is a splice closure.

29. The combination according to claim 23 wherein said housing includes a pressure relief vent adapted to regulate air pressure within the sealed storage space to a first pressure less than a predetermined pressure threshold.

30. The combination according to claim 29 wherein said pressure relief vent comprises a resilient portion of said housing adapted to flex in response to pressure within said housing to selectively vent the sealed storage space to atmosphere when the pressure within the housing is greater than said predetermined pressure threshold.

31. The combination according to claim 30 wherein said resilient portion of said housing is adapted to relax in response to a decrease in said pressure within said housing to selectively hermetically seal said storage space when the pressure within the housing is less than said predetermined pressure threshold.

* * * * *